US010102594B2

(12) United States Patent
Kritt et al.

(10) Patent No.: US 10,102,594 B2
(45) Date of Patent: Oct. 16, 2018

(54) DYNAMIC POWER ALLOCATION AMONG POINTS OF ENERGY CONSUMPTION FOR ATTAINING AN OBJECTIVE

(71) Applicant: International Business Machines Corporation, Armonk, NY (US)

(72) Inventors: Barry A. Kritt, Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 13/737,453

(22) Filed: Jan. 9, 2013

(65) Prior Publication Data

US 2014/0195060 A1 Jul. 10, 2014

(51) Int. Cl.

*G05D 5/00* (2006.01)
*G05D 3/12* (2006.01)
*G05D 9/00* (2006.01)
*G05D 11/00* (2006.01)
*G05D 17/00* (2006.01)
*G06Q 50/06* (2012.01)
*G06Q 90/00* (2006.01)

(52) U.S. Cl.

CPC ............ *G06Q 50/06* (2013.01); *G06Q 90/00* (2013.01)

(58) Field of Classification Search

CPC ........................................................ G06F 17/00
USPC .................................................. 700/291–300
See application file for complete search history.

(56) References Cited

U.S. PATENT DOCUMENTS 5,487,002 A * 1/1996 Diller .................. B60L 11/1861 320/128
5,627,752 A * 5/1997 Buck .................... B60K 26/021 180/65.8
8,989,954 B1 * 3/2015 Addepalli ............. H04W 4/046 370/328

(Continued)

FOREIGN PATENT DOCUMENTS

CN 102639376 9/2010
WO 2012096130 7/2012

OTHER PUBLICATIONS

Artmeier et al., The Optimal Routing Problem in the Context of Battery-Powered Electric Vehicles, May 6, 2010, Germany.

*Primary Examiner* — Ziaul Karim
(74) *Attorney, Agent, or Firm* — Lieberman & Brandsdorfer, LLC

(57) ABSTRACT

Mandatory and optional consumption points are identified to support management of power allocation. A mandatory consumption point is a consumption point required to function at a given time and an optional consumption point is a discretionary consumption point. The energy required for mandatory consumption points to complete their designated functions is calculated. An energy quota is designated for power allocation to the optional consumption points in response to the mandatory consumption point calculation, and the identification of available energy. Energy required for optional consumption points to complete their designated functions is calculated. The optional consumption points are dynamically prioritized and power is allocated to the optional consumption points responsive to this prioritization and with respect to the designated energy quota.

20 Claims, 8 Drawing Sheets

(56) References Cited

U.S. PATENT DOCUMENTS

| | | | | | |
|---|---|---|---|---|---|
| 2008/0178019 | A1* | 7/2008 | McGrane | G06F 1/26 | 713/320 |
| 2008/0183490 | A1* | 7/2008 | Martin | B61L 27/0027 | 705/1.1 |
| 2010/0235654 | A1* | 9/2010 | Malik | G06F 1/3209 | 713/300 |
| 2011/0264933 | A1* | 10/2011 | Forsythe | G06F 1/266 | 713/320 |
| 2012/0035795 | A1* | 2/2012 | Yu | B60W 50/0097 | 701/22 |
| 2012/0191279 | A1* | 7/2012 | Wippler | B60L 15/2045 | 701/22 |
| 2012/0316717 | A1* | 12/2012 | Daum | B60L 11/1842 | 701/22 |
| 2013/0049943 | A1* | 2/2013 | Wendt | B60W 50/14 | 340/439 |
| 2013/0144526 | A1* | 6/2013 | Fuchs | G01C 21/3492 | 701/533 |
| 2013/0218366 | A1* | 8/2013 | Fukuda | G06F 17/00 | 701/1 |
| 2014/0062195 | A1* | 3/2014 | Bruschi | B60L 11/1842 | 307/38 |

* cited by examiner

DYNAMIC POWER ALLOCATION AMONG POINTS OF ENERGY CONSUMPTION FOR ATTAINING AN OBJECTIVE

BACKGROUND

Technical Field

The present invention relates to autonomous allocation of power in a power consuming apparatus or system. More specifically, the invention relates to a system and method that reserves power for operating mandatory power consumption points by dynamically allocating power to optional power consumption points.

Background

A power consuming apparatus or system is energy dependent, and in many circumstances receives energy from a finite source of energy. Multiple sub-devices of the apparatus or system requiring energy may be dependent upon the same source of energy. In a vehicle for instance, sub-devices within the vehicle such as an air-conditioner, headlights, radio, and windshield wipers, are all powered by some source of energy within the vehicle, such as the electricity stored in the battery of the vehicle, gasoline stored in the fuel tank of the vehicle, or an alternate source. These sources are finite, and at some point require replenishment. However, when these sources of energy are depleted, not only do these sub-devices cease to function, but necessary tools required for the vehicle to serve its primary function cease to function as well e.g. the engine of the vehicle or the headlights of the vehicle when operating at night.

SUMMARY OF THE INVENTION

A method, system, and computer program product are provided for autonomously allocating power to optional consumption points in relation to the energy source.

In one aspect, a method is provided for autonomous management of power allocation for a power consuming entity. A mandatory consumption point is a consumption point required to operate at a given time, and an optional consumption point is a discretionary consumption point. To support autonomous allocation, mandatory consumption points are identified and are distinguished from optional consumption points. The energy required to support the mandatory consumption points is calculated. In response to both the mandatory consumption point calculation and a determination of available energy, an energy quota is assessed to address inclusion of any optional consumption points. Energy required to include each optional consumption point is calculated, followed by a dynamic prioritization of the optional consumption points. Power is autonomously allocated to at least one of the prioritized optional consumption points with respect to the designated energy quota and based on the order of priority. Accordingly, mandatory consumption points are prioritized over optional consumption points, which are allocated power with respect to a designated quota.

In another aspect, a computer program product is provided for the implementation of autonomous management of power allocation. When executed, the computer program causes a computer to identify and distinguish a mandatory consumption point from one or more identified optional consumption points. A mandatory consumption point is a consumption point required to operate at a given time, and an optional consumption point is a discretionary consumption point. Energy required to support all of the mandatory consumption points is calculated, and based on a determination of any identified available energy, the program designates an energy quota for including any optional consumption points. With respect to optional consumption points, the program calculates energy required to include each optional consumption point. At least two of the optional consumption points are assigned a priority, and power is allocated to at least one of the prioritized optional consumption points based on the designated energy quota. In one embodiment, the computer program product comprises a computer-readable non-transitory storage medium having computer readable program code embodied thereon. Accordingly, a computer program product is provided to manage allocation of power to optional consumption points up to a designated quota.

In yet another aspect, a system is provided for use with consumption points and an energy consuming product, and for autonomous management of power allocation with respect to the consumption points. A processing unit is provided in communication with memory, and a functional unit is provided in communication with the processing unit. The functional unit is provided with tools to support autonomous management of power allocation. The tools include an identification manager, a calculation manager, a quota manager, a prioritization manager, and a power allocation manager. The identification manager identifies consumption points, and functions to distinguish a mandatory consumption point from an optional consumption point. A mandatory consumption point is a consumption point required to operate at a given time, and an optional consumption point is a discretionary consumption point. The calculation manager calculates the energy required to support the mandatory consumption points, and also calculates the energy required to include each of the identified optional consumption points. The quota manager designates an energy quota for including the optional consumption point(s). This designated energy quota is responsive to the energy calculation for supporting the mandatory consumption points and an identified available energy. The prioritization manager prioritizes at least two of the optional consumption points, and the power allocation manager allocates power in order of priority to at least one of the prioritized optional consumption points with respect to the designated energy quota. Accordingly, the tools described here are provided to support autonomously management of power allocation in the system with respect to assessed mandatory and optional consumption points.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
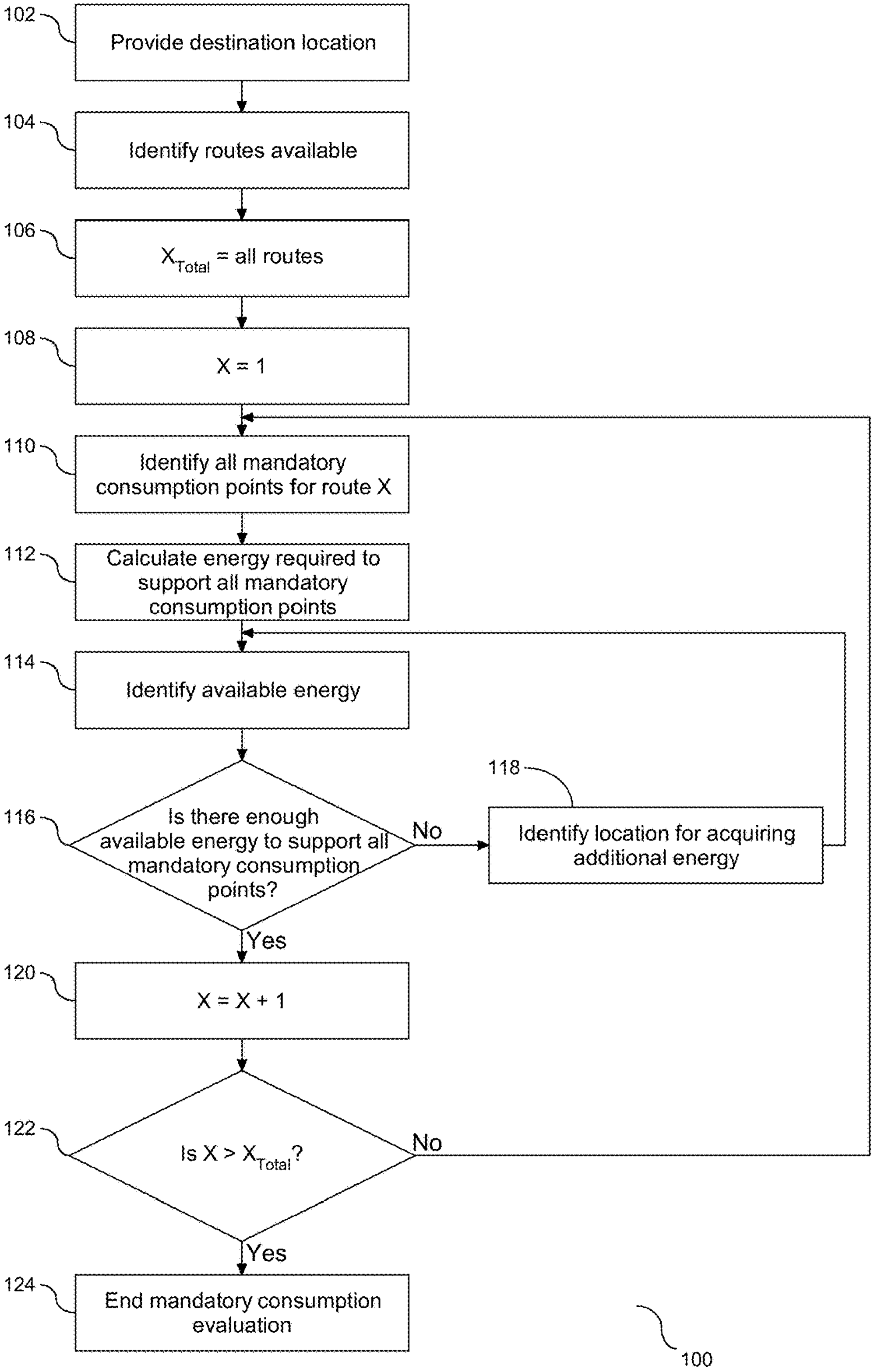
FIG. 1 is a flow chart illustrating a method for evaluating mandatory consumption points.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools, modules, and/or managers. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, the described features, structures, or characteristics may be combined in any suitable manner in one or more embodiments. In the following description, numerous specific details are provided, such as examples of managers, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

A consumption point refers to any device that requires energy to operate. There are two types of consumption points, including mandatory and optional. A mandatory consumption point is required to operate at a given time in order to serve the primary function of a device. An optional consumption point serves a secondary function not critical for the device to serve its primary function. The characteristics of a consumption point are subject to change. For example, a mandatory consumption point may become optional, and an optional consumption point may become mandatory. The change may arise from internal or external factors. Accordingly, mandatory and optional consumption points relate to the device(s) they support and are directed to consuming energy from a finite energy source to support required or optional functionality of the device.

In order to determine the quantity of power that may be allocated to optional consumption points, the energy required by mandatory consumption points must be assessed. FIG. 1 is a flow chart (100) illustrating a process for evaluating mandatory consumption points. For purposes of explanation, in this example, the underlying device is a vehicle with a finite energy supply. The location of a particular destination is provided (102). In one embodiment, the location is determined through a Global Positioning System (GPS). Available routes to reach the destination are identified (104), where $x_{total}$ represents all of the identified routes (106). A counting variable x is initialized, as shown at step (108), with the counting variable representing the individual routes. Consumption points required for transportation to the destination, known hereafter as mandatory consumption points, are identified (110), and energy required to support the mandatory consumption points is calculated (112).

Based on the assessment at step (112), energy available from the energy source is identified (114). Specifically, the identification at step (114) provides insight as to whether the energy source can support the route, $route_x$. Following step (114) it is determined if enough energy is available to support all mandatory consumption points for the route (116). A negative response is followed by an identification of a location for acquiring additional energy (118) to support the route, and specifically to support the mandatory consumption points that are characteristics of the route. Availability of a location to acquire additional energy would enable the route under consideration to remain an option. After the identification at step (118), the process returns to step (114) to complete evaluation of the route. Accordingly, all mandatory consumption points for a route are evaluated in relation to availability of an energy supply and/or energy source.

A positive response to the determination at step (116) is an indication that the route, $route_x$, is an option available for consideration, and is followed by an increment of the counting variable x (120). It is then determined if all of the identified routes have been evaluated (122). A negative response is followed by a return to step (110), while a positive response to the determination at step (122) is followed by a termination of the mandatory consumption point evaluation (124). Accordingly, the energy required to include the mandatory consumption points for each route is identified and is compared to the identified available energy.

Figure 2:
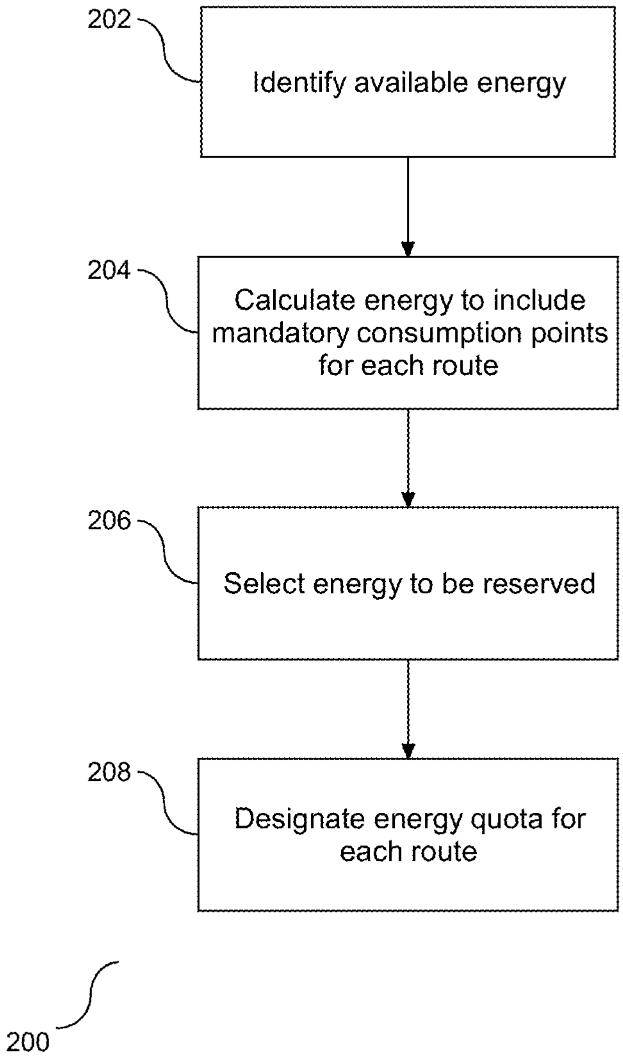
FIG. 2 is a flow chart illustrating a method for designating an energy quota.

FIG. 2 is a flow chart (200) illustrating a method for designating an energy quota for a route. As described above, many energy consuming devices have a finite supply of energy that requires periodic replenishment. An energy quota is the maximum energy allocated to a device or a set of devices. In one embodiment, the energy quota is the maximum energy allocated to support optional consumption point(s). The energy available from the energy source is identified (202). For each route, the energy required to include all mandatory consumption points is calculated (204) as described in detail in FIG. 1. In one embodiment, energy is selected for reserve (206). This selection may be enabled through a selectable percentage of the identified available energy or as a selectable quantity of energy to be reserved. This reserve energy may be selected for the purpose of conserving additional energy for the mandatory consumption points to account for system calculation errors, or unaccounted external or internal factors. These factors may for example include changes in wind current, changes in traffic, changes in road conditions, and/or a changed desired destination. Alternatively, the reserve energy may be selected for the purpose of conserving additional energy for the mandatory consumption points in order to increase energy efficiency. Following the selection at step (206), an energy quota is designated for each route (208). Accordingly, an energy quota is designated with respect to the identified available energy, the energy required to include the mandatory consumption points, and in one embodiment, the selected energy reserve.

Figure 3:
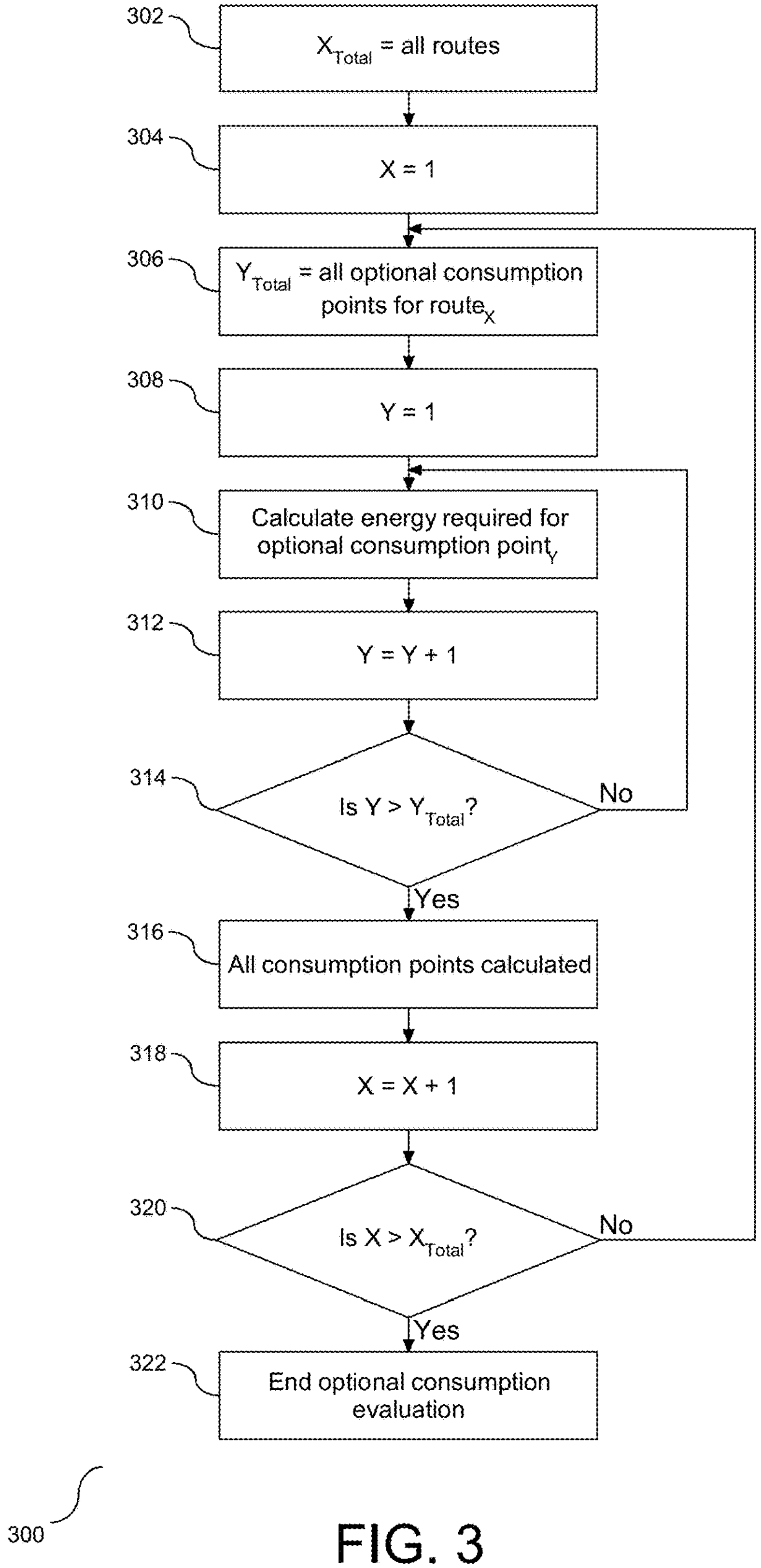
FIG. 3 is a flow chart illustrating a method for evaluating optional consumption points.

The process of designating an energy quota, as demonstrated in FIG. 2, indicates how much energy is available from the energy source after the mandatory consumption points have been assessed. FIG. 3 is a flow chart (300) illustrating a method for calculating the energy required to include one or more optional consumption points while being cognizant of the mandatory consumption points and the energy available. The integer x is initialized (304), where $x_{total}$ represents all identified routes to reach a destination (302). With $y_{total}$ representing all optional consumption points for $route_x$ (306), a counting variable, y, is employed to represent an optional consumption point. The counting variable y is initialized (308). Energy required to include optional consumption $point_y$ is calculated (310), followed by an increment of the counting variable y (312). It is then determined if all of the optional consumption points for $route_x$ have been assessed (314). A negative response is followed by a return to step (310) in order to calculate the energy required for every optional consumption point available for $route_x$, and a positive response is followed by a determination that all optional consumption points for $route_x$ have been calculated (316). The route counting variable x, is incremented (318), and it is determined if all of the routes have been evaluated (320). A negative response is followed by a return to step (306), and a positive response is followed by a determination that the energy required to include each optional consumption point for all routes has been calculated (322), followed by a termination of the optional consumption point evaluation. Accordingly, the energy required to support each optional consumption point for all routes is assessed.

Figure 4:
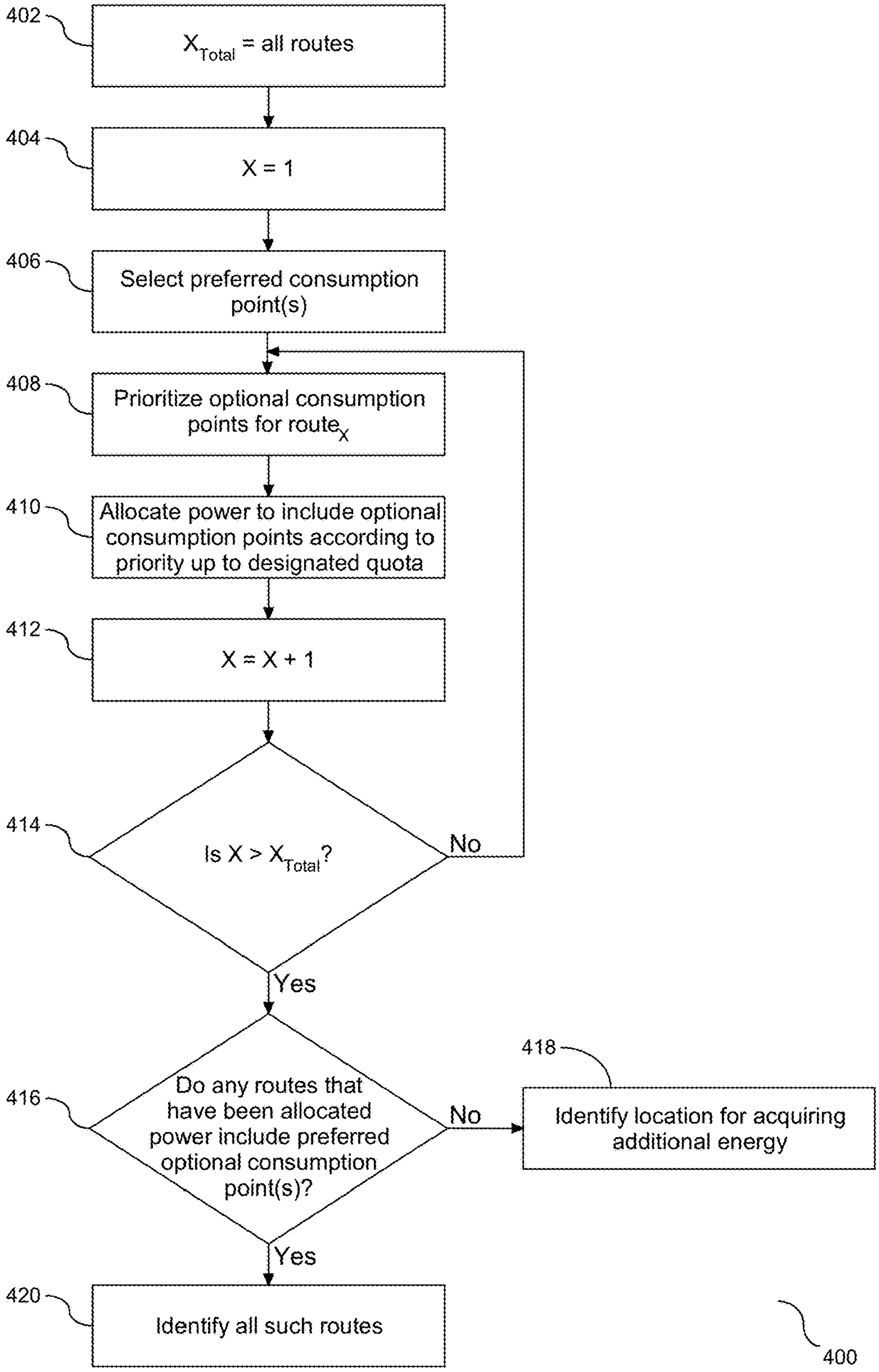
FIG. 4 is a flow chart illustrating a method for prioritizing optional consumption points for power allocation.

Following the assessment of all mandatory and optional consumption points for each optional or available route, the inclusion of optional consumption points may be evaluated. FIG. 4 is a flow chart (400) illustrating a method for prioritizing and allocating power to optional consumption points. The counting variable x is initialized (404), where $x_{total}$ represents all identified routes for travel to a destination (402). In one embodiment, one or more preferred consumption points are selected (406). The optional consumption points as selected at step (406) are prioritized for $route_x$ (408) and in one embodiment, the optional consumption point(s) selected as preferred are given highest priority. In one embodiment, this prioritization is with respect to at least one optional consumption point being selected as a preferred consumption point. Similarly, in one embodiment, the optional consumption points are prioritized autonomously, wherein the most frequently used optional consumption point is given the highest priority. Alternatively, the optional consumption points may be prioritized with respect to the power required to include an optional consumption point. For example, an optional consumption point requiring the least power to function may be given the highest priority. In another embodiment, the optional consumption points are autonomously ranked based on a perceived level of importance. In yet another embodiment, this perceived level of importance is based on the likelihood in which an optional consumption point becomes a mandatory consumption point. Accordingly, various forms of logic may be implemented for prioritization of optional consumption points.

This illustrated selection and prioritization process is repeated for each route subject to evaluation, as shown in steps (412) and (414) where the route counting variable is incremented and an assessment of the routes is conducted, respectively. Responsive to the prioritization, power is allocated to the optional consumption points (410). In one embodiment, the power is allocated to the optional consumption points up to the energy quota designated for $route_x$. Similarly, in one embodiment the quota includes a remainder quantity of energy in reserve. In one embodiment, allocated power is compared to the energy quota by determining the time required to reach the route destination, multiplying the output power required to include the optional consumption points by this determined time to achieve a predicated energy to be consumed, and comparing this predicated energy with the designated energy quota.

Following the allocation at step (410), the value of x is incremented (412), and it is determined if all of the possible routes have been assessed to include optional consumption points (414). A negative response is followed by a return to step (408) and a positive response is followed by an evaluation of the preferred optional consumption points. Specifically, a positive response to the determination at step (414) is followed determining if any routes allocated power include the preferred optional consumption point(s) (416). A negative response to the determination at step (416) is followed by the identification of a location for acquiring additional energy (418). Whereas, a positive response to the determination at step (416) is followed by the identification of all routes that allocate power to the preferred optional consumption point(s) (420). Accordingly, for each available route optional consumption points are prioritized and allocated power based on priority.

Figure 5:
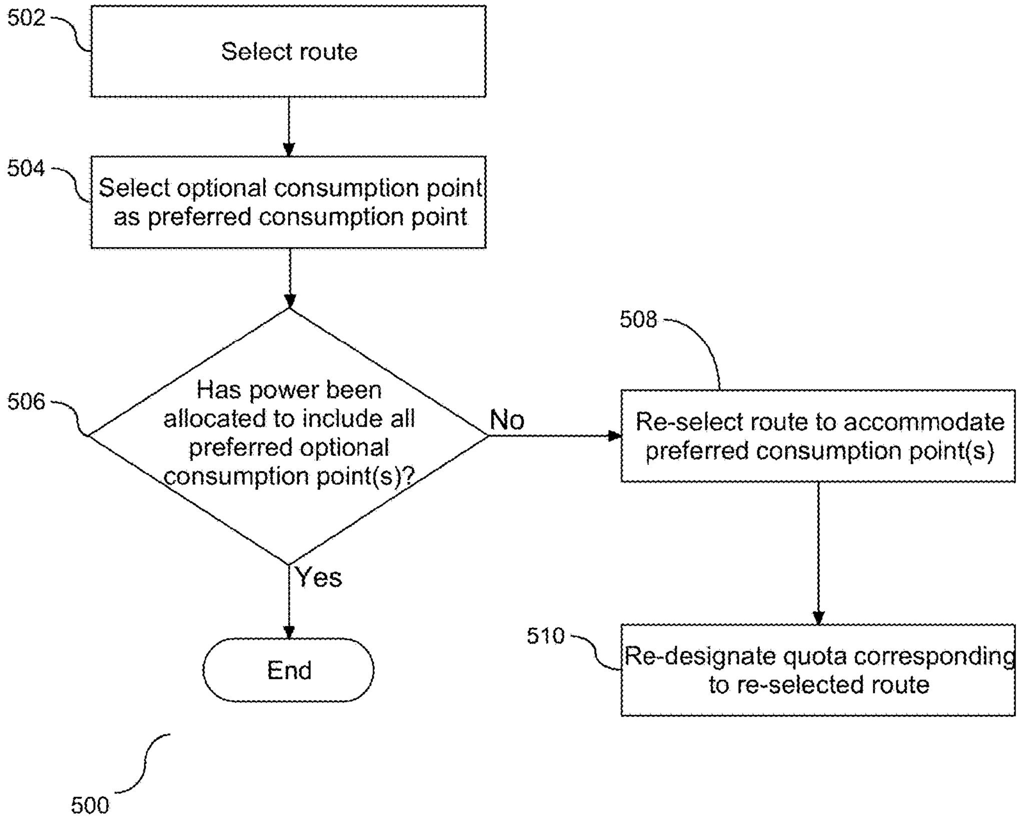
FIG. 5 is a flow chart illustrating a method for re-selection to accommodate a preferred consumption point.

A route may be recommended, selected, and in one embodiment re-selected. Specifically, selection of a route is subject to change, and evaluation of consumption points with respect to availability of energy is conducted based on the change. A changed route may be a new route, a modified route, a change on selection of optional or mandatory consumption points, etc. FIG. 5 is a flow chart (500) illustrating a method for re-selecting a route to accommodate one or more preferred consumption points. A route is selected (502), and at least one optional consumption point is selected as a preferred consumption point (504). It is determined if power has been allocated to include all preferred optional consumption points (506), as demonstrated in FIG. 4. A positive response to the determination at step (506) is followed by a termination of the method based on the assessment that there is enough power to support both the mandatory consumption points and the preferred consumption points. However, a negative response to the determination at step (506) is followed by re-selecting a route to accommodate a preferred consumption point not accommodated by the initially selected route (508). For example, in the instance of a vehicle, fog lights may be required on a specific route and consuming a significant quantity of energy. Use of the fog lights in this instance as a mandatory consumption point may result in the loss of allocated power to a radio in the vehicle. In this instance, if the radio is selected as a preferred consumption point, the route is re-selected to a route that requires less energy so that it can accommodate both the use of fog lights and the radio. In response to the re-selection of a route at step (508), the energy quota is re-designated for the re-selected route (510). The new energy quota at step (510) corresponds to the re-selected route. Accordingly, a route may be re-selected in response to power not being allocated to a preferred optional consumption point.

Figure 6:
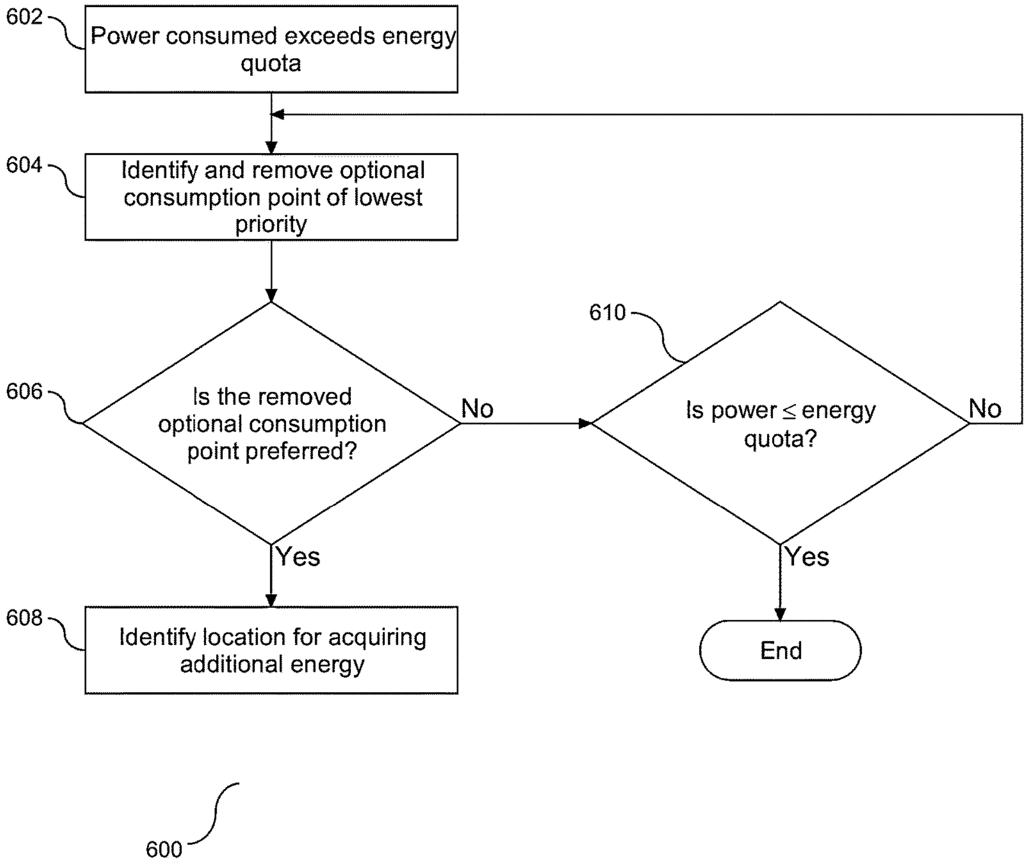
FIG. 6 is a flow chart illustrating a method for removal of an optional consumption point.

The processes demonstrated in FIGS. 4 and 5 demonstrate use of consumption points, prioritization thereof, and selection of a route based on the consumption points. In one embodiment, there may not be a route for better power allocation, and adjustments must be made. Optional consumption points by their very nature are optional, and as such are a good source for an adjustment. Optional consumption points may be included based upon route selection, and at the same time, optional consumption points may be removed. FIG. 6 is a flow chart (600) of one embodiment of the invention, illustrating a method for dynamically removing an optional consumption point. In response to power being consumed by the optional consumption points exceeding a designated quota (602) an optional consumption point of lowest priority is identified and removed (604). As shown in FIG. 4 each optional consumption point for a route is arranged in order of priority. Following the removal at step (604), it is determined if the removed optional consumption point is designated as a preferred consumption point (606). A positive determination at step (606) is followed by the identification of a location for acquiring additional energy (608).

The location identified at step (608) may be along the route, or may require a detour from the route. A negative determination at step (606) is followed by determining if by removal at step (604) the power consumed no longer meets or exceeds the designated energy quota (610). A negative response is followed by a return to step (604). Conversely, a positive response to the determination at step (610) is followed by a termination of the process for removal of optional consumption points. Accordingly, one or more optional consumption points of lowest priority may be dynamically removed until the power consumed does not exceed the energy quota.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
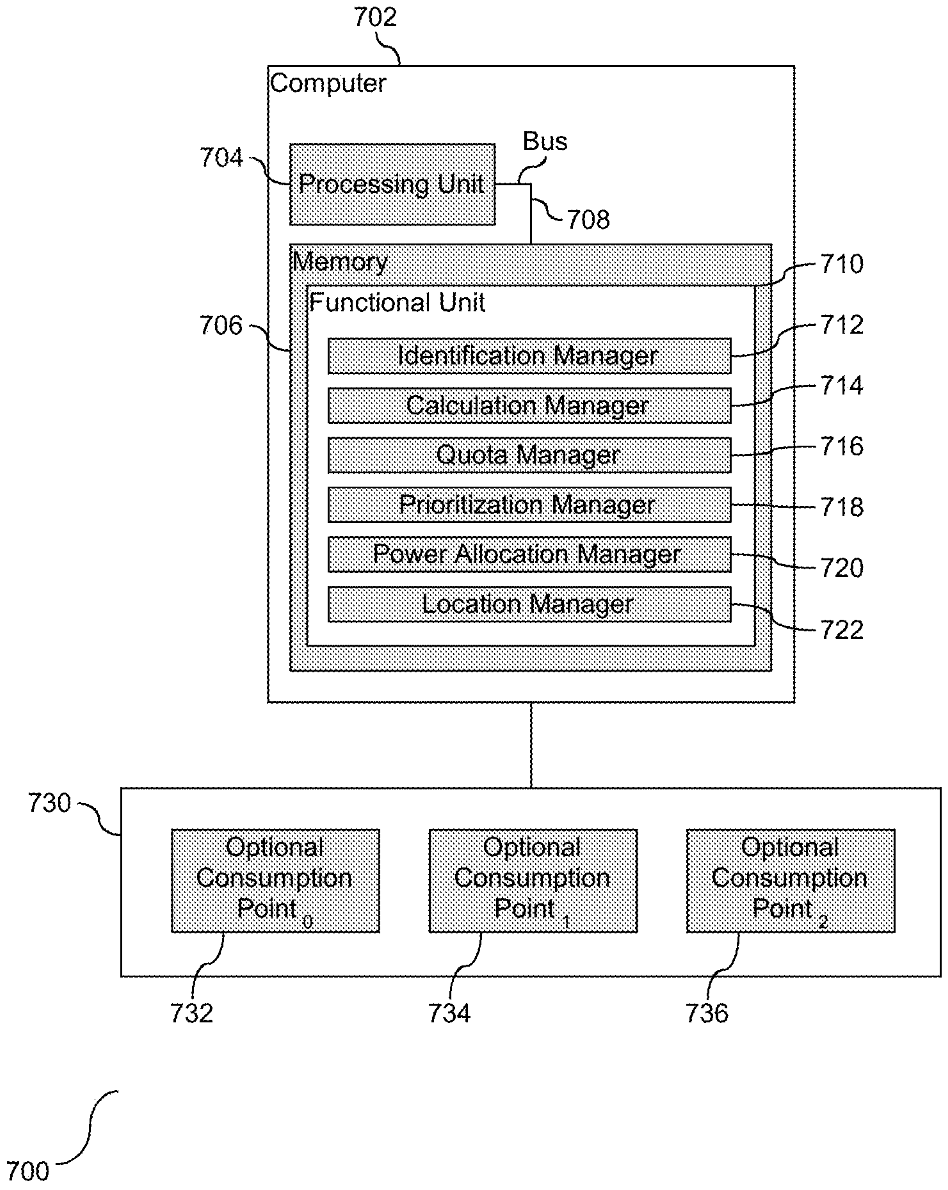
FIG. 7 is a block diagram depicting a system for autonomous power allocation.

As shown in FIGS. 1-6, power is allocated and dynamically managed to attain an objective. FIG. 7 is a block diagram (700) depicting a system for power allocation to consumption points, including mandatory and optional consumption points. A computer (702) is provided in communication with a device (730). Two optional consumption points (732), and (734) and a mandatory consumption point (736), are shown local to the device (730). Mandatory and optional consumption points, (736) and (732), (734), respectively, represent aspects that consume power from an energy utilizing system, apparatus, or device (730). In one embodiment, the computer (702) is a part of the device (730) and functions as a unit. While two optional consumption points and one mandatory consumption point are shown, it is understood that more than two optional consumption points and more than one mandatory consumption point may be implemented. The computer (702) is provided with a processing unit (704) in communication with memory (706) across a bus (708). The processing unit (704) is configured to support consumption point management. The functional unit is provided with a variety of tools for consumption point management. The tools include, but are not limited to, an identification manager (712), a calculation manager (714), a quota manager (716), a prioritization manager (718), and a power allocation manager (720). In one embodiment, a location manager (722) is further included in the functional unit (710). Accordingly, a system is provided with an array of tools to support energy consumption analysis and management.

The identification manager (712) is provided to identify consumption points. This identification includes distinguishing mandatory consumption points from optional consumption points. The calculation manager (714) is provided in communication with the identification manager (712) and calculates energy required to attain an objective. More specifically, the calculation manager (714) calculates energy required to include the identified mandatory consumption points. Additionally, the calculation manager (714) calculates the energy required to include an optional consumption point in conjunction with meeting an objective. Accordingly, the identification manager (712) identifies the consumption points, and the calculation manager (714) calculates the energy required to include these consumption points.

The quota manager (716) is provided in communication with the calculation manager (714). The quota manager (716) designates an energy quota for including optional consumption points. This energy quota is determined based on the energy required to include the mandatory consumption points as calculated by the calculation manager (714), and the energy available to power any consumption point. In one embodiment, the quota manager (716) re-designates the quota in response to a consumption point change, including a mandatory consumption point changing to an optional consumption point and/or an optional consumption point changing to a mandatory consumption point. In one embodiment, the quota manager re-designates the quota in response to a re-selection of the objective. In another embodiment, the quota manager (716) manually decreases the designated energy quota to provide for an energy reserve in the event that the designated needs of the mandatory consumption points prove inadequate. Accordingly, the quota manager (716) controls the designated energy quota limiting the power allocation to optional consumption points.

The prioritization manager (718) is provided in communication with the identification manager (712) and prioritizes the optional consumption points. As discussed above in reference to FIG. 4, there are multiple embodiments for prioritization of the optional consumption points. The power allocation manager (720) is provided in communication with the prioritization manager (718) and the quota manager (716). The power allocation manager (720) allocates power in order of priority to the optional consumption points with respect to the designated energy quota. In one embodiment, the power allocation manager (720) allocates power to the optional consumption points so as not to exceed the designated energy quota. In one embodiment, the power allocation manager (720) removes allocated power from an optional consumption point of lowest priority responsive to exceeding the designated energy quota. Accordingly, the prioritization manager prioritizes the optional consumption points and the power allocation manager allocates power to the optional consumption points in order of priority.

In one embodiment, the location manager (722) is provided in communication with the calculation manager (714). The location manager (722) identifies a location for acquiring additional energy within proximity of the objective in response to the allocation of power to a mandatory consumption point exceeding the available energy. In one embodiment, the location manager (722) selects a preferred optional consumption point, and identifies a location for acquiring additional energy within proximity of the objective in response to the allocation of power to a preferred optional consumption point exceeding the available energy.

In one embodiment, the location manager (722) suggests an alternative objective including acquiring additional energy to attain the objective. In another embodiment, the location manager (722) selects one of the optional consumption points as a preferred consumption point, and in response to the removal of allocated power from the preferred consumption point, re-selects the objective to accommodate the preferred consumption point. Accordingly, the location manager (722) suggests a location to acquire additional energy in response to a determination that there may be a deficiency in available energy.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 8:
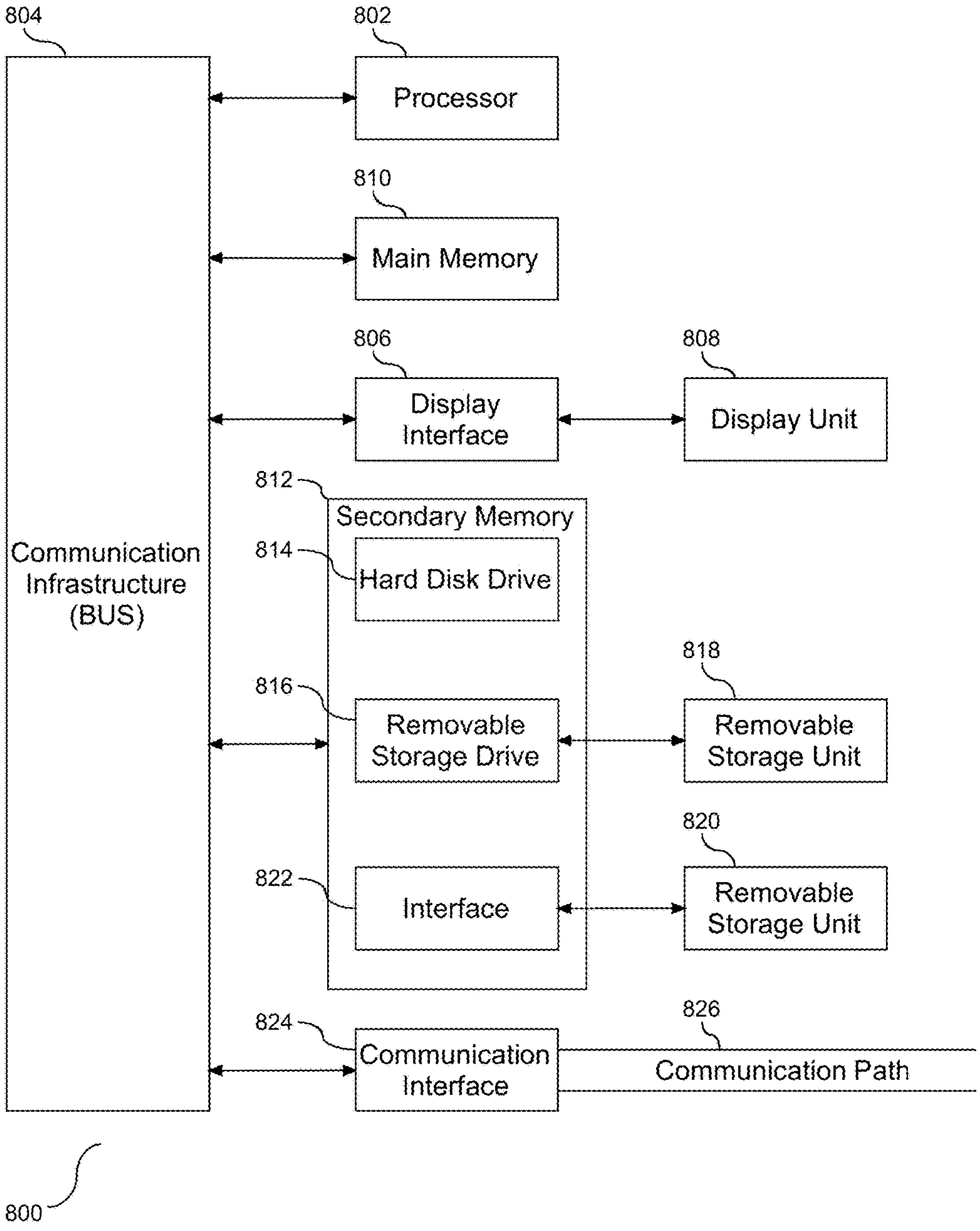
FIG. 8 depicts a block diagram illustrating a system for implementing an embodiment of the present invention.

Referring now to the block diagram (800) of FIG. 8, additional details are now described with respect to implementing an embodiment of the present invention. The computer system includes one or more processors, such as a processor (802). The processor (802) is connected to a communication infrastructure (804) (e.g., a communications bus, cross-over bar, or network).

The computer system can include a display interface (806) that forwards graphics, text, and other data from the communication infrastructure (804) (or from a frame buffer not shown) for display on a display unit (808). The computer system also includes a main memory (810), preferably random access memory (RAM), and may also include a secondary memory (812). The secondary memory (812) may include, for example, a hard disk drive (814) (or alternative persistent storage device) and/or a removable storage drive (816), representing, for example, a floppy disk drive, a magnetic tape drive, or an optical disk drive. The removable storage drive (816) reads from and/or writes to a removable storage unit (818) in a manner well known to those having ordinary skill in the art. Removable storage unit (818) represents, for example, a floppy disk, a compact disc, a magnetic tape, or an optical disk, etc., which is read by and written to by a removable storage drive (816). As will be appreciated, the removable storage unit (818) includes a computer readable medium having stored therein computer software and/or data.

In alternative embodiments, the secondary memory (812) may include other similar means for allowing computer programs or other instructions to be loaded into the computer system. Such means may include, for example, a removable storage unit (820) and an interface (822). Examples of such means may include a program package and package interface (such as that found in video game devices), a removable memory chip (such as an EPROM, or PROM) and associated socket, and other removable storage units (820) and interfaces (822) which allow software and data to be transferred from the removable storage unit (820) to the computer system.

The computer system may also include a communications interface (824). Communications interface (824) allows software and data to be transferred between the computer system and external devices. Examples of communications interface (824) may include a modem, a network interface (such as an Ethernet card), a communications port, or a PCMCIA slot and card, etc. Software and data transferred via communications interface (824) are in the form of signals which may be, for example, electronic, electromagnetic, optical, or other signals capable of being received by communications interface (824). These signals are provided to communications interface (824) via a communications path (i.e., channel) (826). This communications path (826) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (810) and secondary memory (812), removable storage drive (816), and a hard disk installed in hard disk drive or alternative persistent storage device (814).

Computer programs (also called computer control logic) are stored in main memory (810) and/or secondary memory (812). Computer programs may also be received via a communication interface (824). Such computer programs, when run, enable the computer system to perform the features of the present invention as discussed herein. In particular, the computer programs, when run, enable the processor (802) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

ALTERNATIVE EMBODIMENT

It will be appreciated that, although specific embodiments of the invention have been described herein for purposes of illustration, various modifications may be made without departing from the spirit and scope of the invention. Specifically, dynamic power evaluation and consumption may be extended to any power consuming device, and is not limited to a vehicle. In the cause of a vehicle or a non-vehicle, mandatory and optional consumption points may be referred to as objectives for supporting the power consuming device. Accordingly, the scope of protection of this invention is limited only by the following claims and their equivalents.

We claim:

1. A computer implemented method using a processor, the method comprising:

identifying and distinguishing one or more mandatory consumption points from one or more optional consumption points, wherein:

a mandatory consumption point is a consumption point required to operate at a given time comprising at least one of transportation to a destination via at least one route and at least one energy consuming sub-device; and an optional consumption point is a discretionary consumption point comprising at least one energy consuming sub-device;

calculating a first energy, including calculating a mandatory energy to reach a destination along a route, wherein the mandatory energy is an amount of energy required to operate the identified mandatory consumption points along the route;

determining an available energy;

in response to the first energy being less than or equal to the available energy:

designating an energy quota based on the first energy;

calculating a second energy, including calculating an optional energy to reach the destination along the route, wherein the optional energy is an amount of energy required to operate the one or more optional consumption points along the route;

dynamically prioritizing the one or more optional consumptions points based on metrics, wherein the metrics include: frequency of use and required energy; and autonomously allocating power in order of priority to at least one of the prioritized optional consumption points with respect to the energy quota; and in response to the first energy exceeding the available energy, autonomously identifying a location for acquiring additional energy and re-directing the available energy to usage of the route.

2. The method of claim 1, further comprising selecting one of the optional consumption points as a preferred consumption point and autonomously identifying the location for acquiring additional energy when allocated power is removed from the preferred consumption point.

3. The method of claim 1, further comprising selecting one of the optional consumption points as a preferred consumption point, and in response to removing allocated power from the preferred consumption point, re-selecting the route to accommodate a required amount of optional energy for use by the preferred consumption point, and re-designating the energy quota responsive to the re-selected route.

4. The method of claim 1, further comprising re-designating the energy quota in response to a consumption point change, wherein a consumption point change is selected from the group consisting of: a mandatory consumption point changing to an optional consumption point, and an optional consumption point changing to a mandatory consumption point.

5. The method of claim 1, wherein calculating the first energy comprises designating a quantity of reserve energy, and wherein designating the energy quota comprises calculating a difference between the mandatory energy and the reserve energy.

6. The method of claim 1, further comprising removing allocated power from an optional consumption point of lowest priority responsive to exceeding the energy quota.

7. The method of claim 1, wherein the autonomous power allocation is associated with the at least one energy consuming sub-device, the energy consuming sub-device having a finite energy supply, wherein the energy consuming sub-device comprises at least one of a fog light, a radio, an air-conditioner, a headlight, and a windshield wiper.

8. The method of claim 1, wherein the location requires a detour from the route.

9. The method of claim 1, further comprising changing the route in response to the location identification, and re-directing the available energy to usage of the changed route.

10. A computer program product for use with at least one consumption point, the computer program product comprising a computer-readable non-transitory storage medium having computer readable program code embodied thereon, which when executed causes a computer to implement the method comprising:

identifying and distinguishing one or more mandatory consumption points from one or more optional consumption points, wherein:

a mandatory consumption point is a consumption point required to operate at a given time comprising at least one of transportation to a destination via at least one route and at least one energy consuming sub-device; and an optional consumption point is a discretionary consumption point comprising at least one energy consuming sub-device;

calculating a first energy, including calculating a mandatory energy to reach a destination along a route, wherein the mandatory energy is an amount of energy required to operate the identified mandatory consumption points along the route;

determining an available energy;

in response to the first energy being less than or equal to the available energy:

designating an energy quota based on the first energy;

calculating a second energy, including calculating an optional energy to reach the destination along the route, wherein the optional energy is an amount of energy required to operate the one or more optional consumption points along the route;

dynamically prioritizing the one or more optional consumptions points based on a metric selected from the group consisting of: frequency of use and required energy; and autonomously allocating power in order of priority to at least one of the prioritized optional consumption points with respect to the energy quota; and in response to the first energy exceeding the available energy, autonomously identifying a location for acquiring additional energy and re-directing the available energy to usage of the route.

11. The computer program product of claim 10, further comprising program code to select one of the optional consumption points as a preferred consumption point, and autonomously identify the location for acquiring additional energy when allocated power is removed from the preferred consumption point.

12. The computer program product of claim 10, further comprising program code to select one of the optional consumption points as a preferred consumption point, and in response to removal of an allocated power from the preferred consumption point, re-select the route to accommodate a required amount of optional energy for use by the preferred consumption point, and re-designate the energy quota responsive to the re-selected route.

13. The computer program product of claim 10, further comprising program code to re-designate the energy quota in response to a consumption point change, wherein a consumption point change is selected from the group consisting of: a mandatory consumption point changing to an optional consumption point, and an optional consumption point changing to a mandatory consumption point.

14. The computer program product of claim 10, wherein calculating the first energy comprises program code to designate a quantity of reserve energy, and wherein designating the energy quota comprises calculating a difference between the mandatory energy and the reserve energy.

15. The computer program product of claim 10, further comprising program code to remove allocated power from an optional consumption point of lowest priority responsive to exceeding the energy quota.

16. A system comprising:

a processing unit in communication with memory; and a functional unit in communication with the processing unit, the functional unit having tools to support autonomous power allocation, the tools comprising:

an identification manager to identify consumption points, including the identification manager to distinguish one or more mandatory consumption points from one or more optional consumption points, wherein:

a mandatory consumption point is a consumption point required to operate at a given time comprising at least one of transportation to a destination via at least one route and at least one energy consuming sub-device; and an optional consumption point is a discretionary consumption point comprising at least one energy consuming sub-device;

a calculation manager in communication with the identification manager, the calculation manager to determine an available energy and calculate a first energy, including calculating a mandatory energy to reach a destination along a route, wherein the mandatory energy is an amount of energy required to operate the identified mandatory consumption points;

a quota manager in communication with the calculation manager, and in response to the first energy being less than or equal to the available energy, the quota manager to designate an energy quota based on the first energy;

the calculation manager to calculate a second energy, including calculating an optional energy to reach the destination along the route, wherein the optional energy is an amount of energy required to operate the one or more optional consumption points along the route;

a prioritization manager in communication with the identification manager, the prioritization manager to prioritize at least two optional consumption points based on metrics, wherein the metrics include: frequency of use and required energy;

a power allocation manager in communication with the prioritization manager and the quota manager, the power allocation manager to allocate power in order of priority to at least one of the prioritized optional consumption points with respect to the energy quota; and a location manager in communication with the calculation manager, and in response to the first energy exceeding the available energy, the location manager to autonomously identify a location for acquiring additional energy and re-direct the available energy to usage of the route.

17. The system of claim 16, further comprising a location manager in communication with the calculation manager, the location manager to select one of the optional consumption points as a preferred consumption point, and in response to the removal of allocated power from the preferred consumption point, re-select the route to accommodate a required amount of optional energy for use by the preferred consumption point, and the quota manager to re-designate the energy quota responsive to the re-selected route.

18. The system of claim 16, further comprising the quota manager to re-designate the energy quota in response to a consumption point change, wherein a consumption point change is selected from the group consisting of: a mandatory consumption point changing to an optional consumption point, and an optional consumption point changing to a mandatory consumption point.

19. The system of claim 16, further comprising the quota manager to manually decrease the energy quota to conserve more energy for the mandatory consumption points.

20. The system of claim 16, further comprising the power allocation manager to remove allocated power from an optional consumption point of lowest priority responsive to exceeding the energy quota.

* * * * *